Jan. 20, 1925.
S. F. ARBUCKLE
1,523,384
MONOGRAM HEADLIGHT LENS
Filed Nov. 15, 1922    2 Sheets-Sheet 1
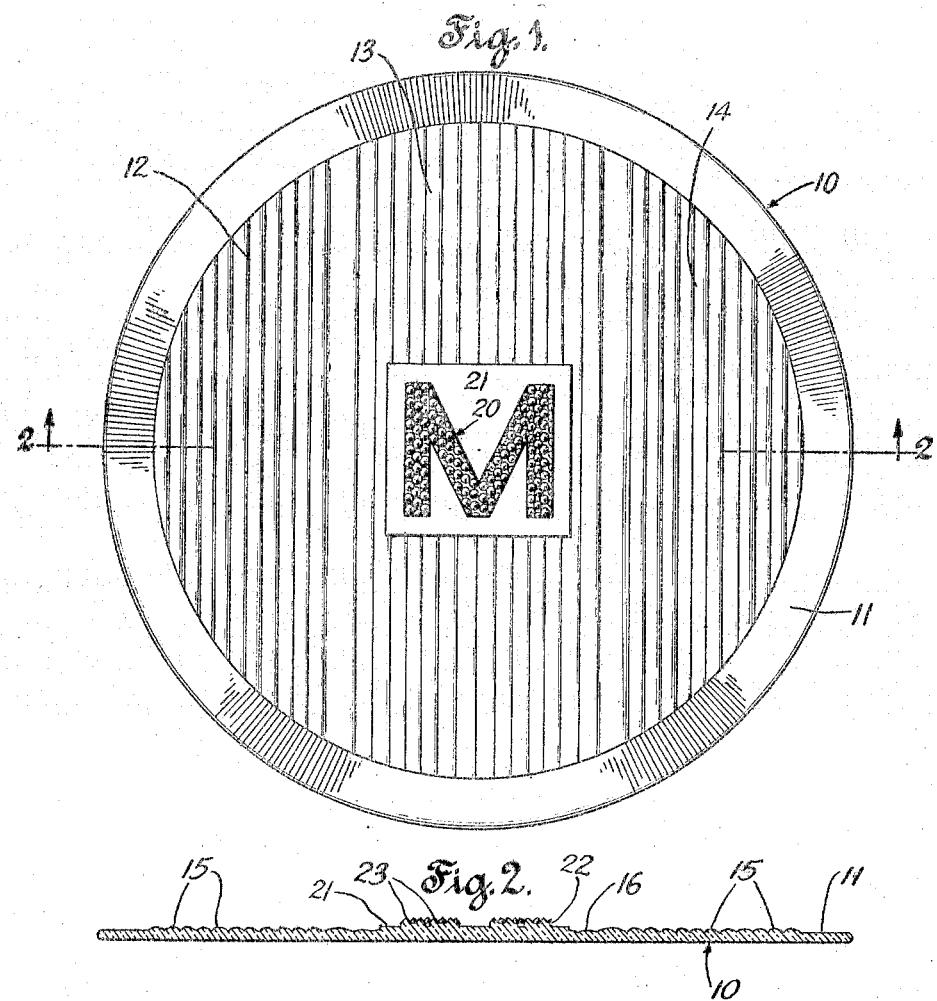
INVENTOR
Samuel F. Arbuckle
BY
Chester H. Russell
ATTORNEY

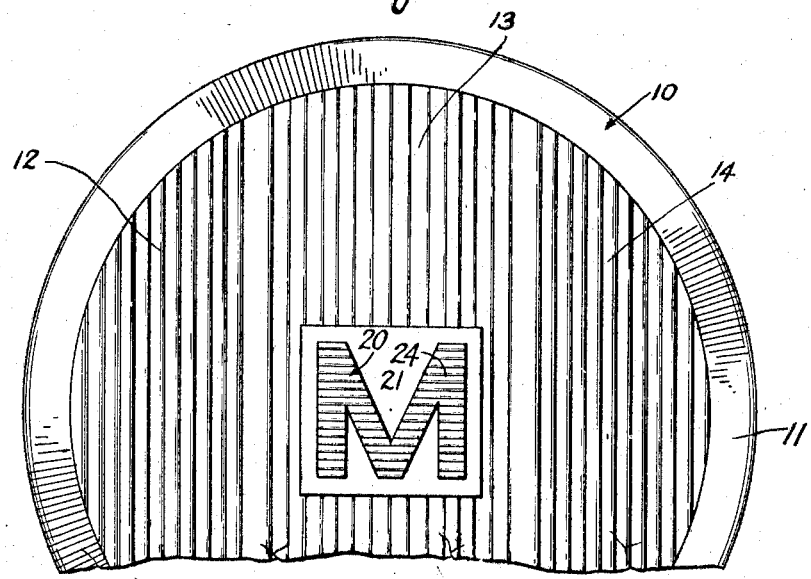
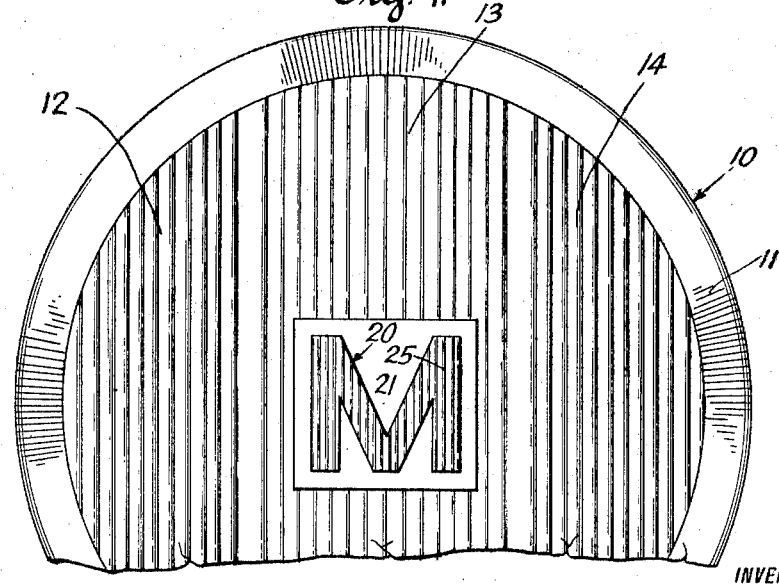

Patented Jan. 20, 1925.

1,523,384

UNITED STATES PATENT OFFICE.

SAMUEL F. ARBUCKLE, OF DETROIT, MICHIGAN, ASSIGNOR TO MONOGRAM LENS CORPORATION, OF NEW YORK, N. Y., A CORPORATION OF DELAWARE.

MONOGRAM HEADLIGHT LENS.

Application filed November 15, 1922. Serial No. 601,001.

*To all whom it may concern:*

Be it known that I, SAMUEL F. ARBUCKLE, a citizen of the United States, residing at Detroit, in the county of Wayne and State of Michigan, have invented certain new and useful Improvements in Monogram Headlight Lenses, of which I declare the following to be a full, clear, and exact description.

The present invention relates to a front cover for a headlight such as automobile headlights and the like, provided with a monogram readable from the front, but preferably located in or on the rear surface of the glass, and preferably to that type of front glass cover plate for headlights having incorporated therein means for laterally distributing the light to provide a driving light with a high central intensity with an extended area on either side thereof or means to otherwise diffuse or deflect the rays of light with a monogram incorporated therein, said monogram provided with means for diffusing, modifying or deflecting rays of light passing through the monogram in such a manner as to cause the monogram to particularly stand out and attract the eye both when the headlight is lit or when unlighted.

An object of the present invention is therefore to provide a front glass plate for a reflector, said plate being either smooth or having diffusing or deflecting means therein or thereon and to provide the same with a monogram molded or otherwise formed therein in raised or lowered letters with the face of the lettering of the monogram provided with means to concentrate or otherwise diffuse or deflect either transmitted or reflected rays of light in such a way as to make the monogram particularly prominent and contrasting with respect to the glass plate proper.

A further object of the present invention is to provide, for example, a glass ribbed plate for scientifically distributing the rays of light reflected forwardly by the reflector of a headlight and to provide a monogram thereon with means such as prisms, lenses and the like for concentrating or modifying the passage of the light through the monogram in a contrasting manner from the distributed light passing through other deflecting and distributing portions of the front glass cover plate.

A further object of the present invention is to provide a light distributing plate having a plurality of zones of different transverse ribs with a monogram thereon located in a clear portion, the side walls of the monogram being perpendicular to the plane of the glass and the face of the monogram being provided with means to deflect the rays of light in a materially different manner from the deflection of the rays through the ribbed zones.

Various other objects are within the scope of this invention such as relate to the arrangement of the related elements or the structure and to various details of construction and to economies of manufacture and numerous other features as will be apparent from a consideration of the drawing and related description of a form of the invention, which may be preferred, in which Figure 1 is a plan view of the rear of the lens constituting one embodiment of the present invention.

Figure 2 is a section on line 2—2 of Figure 1.

Figures 3 and 4 are views similar to Figure 1 showing modifications of the present invention.

Referring to Figures 1 and 2 it will be seen that the circular glass cover plate 10, having the usual rim 11, for attachment in the headlight is provided with a plurality of zones 12, 13 and 14 of vertical convex ribs 15 and 16, the ribs of the zones 12 and 14 being similar and presenting relatively sharp angles of curvature, while the ribs 16 of the zone 13 are flattened to distribute the light through different angles as will be understood by those skilled in the art. The zoning of the ribs and their configuration may be made in accordance with my previous applications Serial Number 536,024, filed February 13th, 1922, and Serial Number 551,-645, filed April 11th, 1922. The monogram 20 is illustrated in the present instance as molded in the glass and is located on a clear portion 21, the sides 22 of the letters of the monogram being perpendicular to the plane of the clear or smooth portion 21 as will be apparent from an inspection of Figures 1 and 2. The face of the monogram 20 is provided with a plurality of cone-shaped lenses 23 in the embodiment illustrated in Figures 1 and 2, these projections being conveniently made by forming a plurality of the depressions with a prick punch or other tool on the surface of the monogram in the mold from which the glass plate 10 is made.

It will thus be seen that the light passing through the glass 10 is laterally distributed by the zones 12, 13 and 14 in a predetermined desired manner to provide a horizontally wide spread driving light with a high central intensity of illumination and at the same time the monogram is provided with means for concentrating or diffusing or deflecting rays of light reflected by or passing through it at various angles materially different from the passage of the rays through the zones 12, 13 and 14 with the result that the monogram strikingly attracts the eye of the observer and the utility and value of the device as a whole is greatly enhanced.

In Figures 3 and 4 the glass 10 is provided with ribbed zones 12, 13 and 14 as in Figure 1 and 2; the monogram 20 is located on the clear glass portion 21 while the light modifying means on the face of the monogram in Figure 3 is illustrated as a plurality of relatively low close transverse ribs 24. In Figure 4 the front face of the monogram 20 is provided with vertical ribs 25, the ribs 24 and 25 of Figures 3 and 4 being constructed to diffuse the light through a different angle and in a different direction in the case of Figure 3, from that of the ribs of the several zones 12, 13 and 14 to thereby form a suitable contrast and particularly pleasing and effective means for rendering the monogram quickly and strikingly attracted by the eye of the observer both by reason of transmitted light when the headlight is lit and by reflected light as, for example, when viewed in daylight or other outside source of light.

It is to be understood that the ribs 24 and 25 illustrated in Figures 3 and 4 are made by grooving the front face of the monogram 20 of the mold from which the plates 10 are cast as will be understood from the foregoing and with reference to my prior co-pending applications.

It is apparent that, within the spirit of the invention modifications and different arrangements may be made other than as herein disclosed and the present disclosure is illustrative merely; the invention comprehending all variations thereof.

Having thus described my invention, what I desire to secure by United States Letters Patent and claim is:

1. A cover front for headlights comprising a glass plate, a plurality of light deflecting means in said plate, a monogram and a plurality of light concentrating means on said monogram.

2. A cover front for headlights comprising a glass plate, a plurality of light deflecting means in said plate, a clear portion therein, a raised monogram in said clear portion and a plurality of light concentrating means on the raised portion of said monogram.

3. A cover front for headlights comprising a glass plate, a plurality of light deflecting means extending across said glass plate, a clear portion therein, a raised monogram on said clear portion with the side walls of said monogram perpendicular to the face of the clear portion, and a plurality of light deflecting means on the face of said monogram arranged to deflect rays of light differently from the rays passing through the aforesaid light deflecting means.

4. A cover plate for headlights comprising a plurality of vertical convex ribs arranged to deflect the light laterally through different angles to provide a horizontally wide-spread driving light, a monogram thereon and light deflecting means on the face of said monogram refracting light differently than that refracted by said ribs to contrast the monogram from the other portions of said cover plate.

5. A glass cover plate for headlights comprising light deflecting means, a monogram on said cover plate and means for modifying the light passing through said monogram to contrast the same with the light passing through the other portions of said cover plate.

6. A cover front for headlamps comprising a glass plate having a light refracting area for deflecting the light rays passing therethrough, a clear non-refracting area in said plate, and a second refracting area in said clear area deflecting the light rays differently than in said first area.

7. A cover front for headlamps comprising a glass plate having a light refracting area for deflecting the light rays passing therethrough, and a second light refracting area included in said first area, the deflection produced by said second refracting area differing from that produced by the first area.

In testimony whereof, I affix my signature.

SAMUEL F. ARBUCKLE.